T. M. HOLLAND.
ROPE OR CABLE CLAMP.
APPLICATION FILED SEPT. 5, 1917.

1,320,691.

Patented Nov. 4, 1919.

Witnesses

Inventor
T. M. Holland

UNITED STATES PATENT OFFICE.

THOMAS M. HOLLAND, OF YUMA, ARIZONA.

ROPE OR CABLE CLAMP.

1,320,691.  Specification of Letters Patent.  Patented Nov. 4, 1919.

Application filed September 5, 1917. Serial No. 189,801.

*To all whom it may concern:*

Be it known that I, THOMAS M. HOLLAND, a citizen of the United States, residing at Yuma, in the county of Yuma and State of Arizona, have invented certain new and useful Improvements in Rope or Cable Clamps; and I do hereby declare the following to be a full, clear, and exact description of the invention, such as will enable others skilled in the art to which it appertains to make and use the same.

This invention relates to a rope or cable clamp and has for one of its objects the provision of a device of this character especially adapted for securing the end of a guide cable or the like about an anchor or permanent object.

Another object of this invention is the provision of a block having means for receiving and securing a cable or rope after the same has been placed about an anchor or permanent object.

Further object of this invention is the provision of flanges formed upon the block having grooves for receiving the cables and which cables are caught and held in said grooves by toggles pivotally mounted on the block.

A still further object of this invention is the provision of a rope or cable clamp of the above stated character which shall be simple, durable and efficient and which may be manufactured and sold at a comparatively low cost.

With these and other objects in view as will become more apparent as the description proceeds, the invention consists in such novel features of construction, combination and arrangement of parts as will be hereinafter more fully described and claimed.

For a complete understanding of my invention, reference is to be had to the following description and accompanying drawing, in which—

Figure 1:
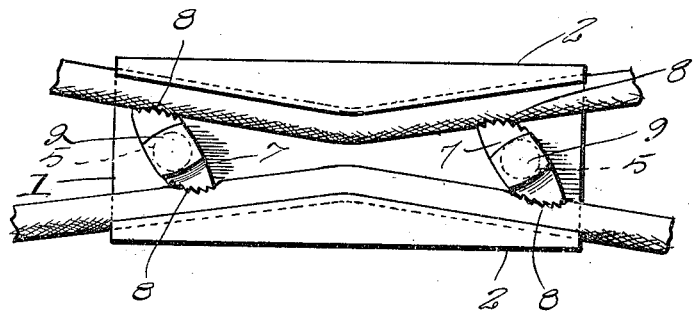
Figure 1 is a plan view of a rope or cable clamp constructed in accordance with my invention.
Figure 2:
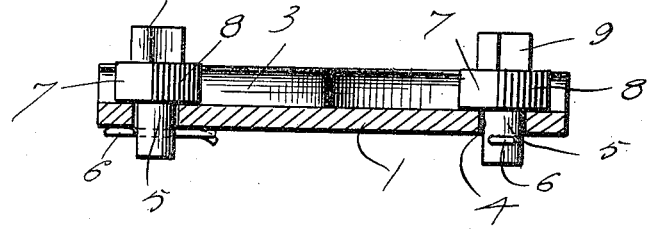
Fig. 2 is a longitudinal sectional view of the same.
Figure 3:
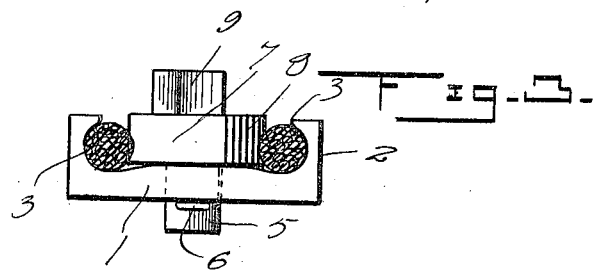
Fig. 3 is an end view illustrating one of the toggles engaging the cable or rope.
Figure 4:
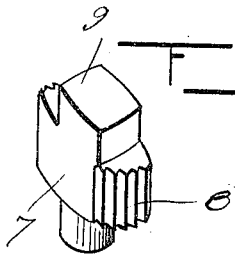
Fig. 4 is a perspective of one of the toggles.

Referring in detail to the drawing, the numeral 1 indicates an elongated block having formed upon each longitudinal edge thereof outwardly disposed flanges 2 which are provided with grooves 3 upon their inner faces for receiving a cable or rope as illustrated in Fig. 1. The flanges 2 converge from their ends in the direction of their medial portions as clearly illustrated in Fig. 1. The block 1 is provided with apertures 4 adjacent each end thereof to receive shanks 5 which are rotatably secured within the apertures 4 by cotter pins 6. The shanks 5 have formed thereupon toggles 7 which have oppositely disposed corrugated faces 8, which faces are adapted to engage the cable or rope as illustrated in Fig. 1 for forcing the same in tight engagement with the grooves 3 of the flanges 2, thus preventing the cable from slipping in the block. Each of the toggles 7 is provided with a squared head 9 upon the top faces thereof whereby the toggles may be disengaged from the cable or rope by applying a suitable tool to the head 9 and rotating the toggles.

In operation, a rope or cable is placed in one of the grooves 3 of one of the flanges 2 and passed about an anchor or permanent object and passed through the other groove 3 of the other flange 2. The toggles are then turned into engagement with the cable or rope as illustrated in Fig. 1 and the greater the pull upon the cable or rope, the tighter the toggles will force the cable or rope in the grooves of the flanges and owing to the inclination of the flanges the rope or cable will be prevented from slipping in the block.

While I have shown and described the preferred embodiment of my invention, it will be understood that minor changes in construction, combination and arrangement of parts may be made without departing from the spirit or scope of the invention, as claimed.

Having thus described my invention, what I claim is:—

1. A rope or cable clamp comprising a block, flanges formed on the longitudinal edges of said block and having grooves upon their inner faces adapted to receive the cable, said flanges having their inner faces converging from their outer ends to their intermediate portions, and toggles rotatably mounted in each end of the block and adapted to engage the cable for forcing said cable into the grooves.

2. A rope or cable clamp comprising a block, flanges formed upon said block and having grooves upon their inner faces, the inner faces of said flanges converging from their outer ends to their intermediate portions, shanks rotatably mounted in each end of the block, toggles formed upon said shanks and having oppositely disposed inclined serrated faces adapted to engage the rope or cable to force the same into engagement with the grooves, and pins formed upon the toggles for receiving a tool to disengage the toggles from the rope or cable.

In testimony whereof I affix my signature in the presence of two witnesses.

THOMAS M. HOLLAND.

Witnesses:
FRANK L. BURLEIGH,
LAWRENCE SAVAGE.

Copies of this patent may be obtained for five cents each, by addressing the "Commissioner of Patents, Washington, D. C."